United States Patent Office 3,335,041
Patented Aug. 8, 1967

3,335,041
METHOD OF SPLICING THE ENDS OF TIRE TREAD STOCK
Alan Paul Osborne, Wood End, near Atherstone, England, assignor to Dunlop Rubber Company Limited, London, England, a British company
No Drawing. Filed May 15, 1964, Ser. No. 367,868
Claims priority, application Great Britain, June 5, 1963, 22,295/63
8 Claims. (Cl. 156—110)

This invention relates to adhesive compositions.

According to the present invention an adhesive composition comprises a polymer of a conjugated diene, having at least a proportion of the diene units in the polymer in a trans-configuration.

The adhesive compositions of the present invention are generally used in the form of solutions in which the ingredients of the composition are dissolved or dispersed in an organic solvent for the polymer of the conjugated diene. The polymers that are useful in the adhesive composition are the trans-polymers of conjugated dienes such as isoprene, butadiene, and piperylene, and it has been found that the use of such polymers enables an adhesive to be obtained which has a high strength in the unvulcanized state. This has advantages when the adhesive employed cannot be vulcanized, for instance in jointing tyre treads prior to vulcanization, where the adhesive is required to hold the spliced ends of the tread together during manufacture of the tyre and prior to vulcanization.

The adhesive composition can contain, in addition to the trans-polymer of the conjugated diene, one or more elastomers compatible with the trans-polymer and the choice of the elastomer depends to some extent on the use to which the adhesive is to be put. For example, when the adhesive properties of the adhesive composition are employed with the adhesive in the vulcanized state, then typical examples of the further elastomer are natural rubber, cis-polybutadiene, cis-polyisoprene, emulsion-produced polybutadiene, copolymers of butadiene and styrene with or without oil-extension, and copolymers of ethylene and propylene. When the adhesive properties are employed with the adhesive in the unvulcanized state, then the further elastomer can be butyl rubber, polyisobutylene, or amorphous polypropylene in addition to those elastomers mentioned hereinbefore.

The strength of the adhesive when used in the unvulcanized condition is generally proportional to the amount of trans-configuration present in the polymer or in the polymer/elastomer blend and thus for any application the properties required may be controlled either at the polymerization stage or by suitably blending the transpolymer of the conjugated diene with a non-crystallising polymer at any convenient later stage after polymerization.

The adhesive compositions of the present invention are vulcanizable by conventional techniques, such as by sulphur with or without vulcanization accelerators as desired, antioxidants and antiozonants. The adhesive compositions in the unvulcanized state are soluble or dispersible in a range of solvents, particularly the chlorinated solvents such as chloroform, ethylene dichloride, and trichloroethylene, and in this form can be easily applied to the surface to be joined. After application to the surfaces the solvent is allowed to evaporate and the coated surfaces brought together, and depending on the nature of the process in which the adhesion is employed, can be vulcanized by heating.

The unvulcanized films formed from the adhesive composition according to the present invention can be reactivated by heating. The compositions can contain a high proportion of filler material in addition to the elastomer mentioned. In addition, the adhesive compositions can contain resinous additives to improve the tack of the adhesive or the resistance to heat, and examples of such additives are petroleum hydrocarbon resins, para-substituted phenol/formaldehyde resins, terpene resins, coumarone-indene resins, and many derivatives of wood rosin.

The invention is illustrated in the following example:

*Example*

Three compositions A, B and C were prepared according to the following formulae:

|  | A | B | C |
|---|---|---|---|
| Oil-extended butadiene/styrene copolymer containing 37.5 parts of oil per 100 parts of polymer | 75 | 75 | 75 |
| Low temperature polymer of butadiene and styrene | 25 | | |
| Trans-polyisoprene (98% trans) | | 25 | |
| Trans-polybutadiene (95% trans) | | | 25 |
| ISAF Black | 55.0 | 55.0 | 55.0 |
| Zinc oxide | 3.0 | 3.0 | 3.0 |
| Stearic acid | 1.0 | 1.0 | 1.0 |
| Sulphur | 1.6 | 1.6 | 1.6 |
| N-cyclohexyl 2-benzothiazole sulphenamide | 1.0 | 1.0 | 1.0 |
| 4-isopropylaminodiphenylamine | 3.0 | 3.0 | 3.0 |
| Mineral oil | 10.0 | 10.0 | 10.0 |

The three compositions were each mixed on a mill and after mixing were each dispersed in mixed solutions of 80 parts by volume of petroleum naphtha, 10 parts by volume of toluol containing 10 parts by weight per 100 parts total polymer of a resin based on butenes and butadiene (a $C_4$ resin).

Each of the adhesive compositions so obtained was cast in the form of a film and allowed to dry. The films were tested for their tensile stress, elongation at the maximum tensile stress, and elongation at break at elongation rates of 5 in./min. and 50 in./min.

|  | Composition | | |
|---|---|---|---|
|  | A | B | C |
| Maximum tensile stress (p.s.i.) at elongation rate of— | | | |
| (a) 5 in./min | 30 | 211 | 234 |
| (b) 50 in./min | 44 | 170 | 294 |
| Elongation at maximum tensile stress (percent) at elongation rate of— | | | |
| (a) 5 in./min | 0 | 496 | 18 |
| (b) 50 in./min | 0 | 960 | 20 |
| Elongation at break (percent) at elongation rate of— | | | |
| (a) 5 in./min | 592 | 512 | 38 |
| (b) 50 in./min | 662 | 975 | 25 |

The results clearly show that the adhesive compositions B and C were superior to the composition containing no trans-polyisoprene or trans-polybutadiene.

In a test simulating tread joining and subsequently stressing the trans-polyisoprene containing adhesive maintained a satisfactory joint whilst the adhesive based on composition A failed. In stripping tests on tread compounds bonded with the adhesive based on composition B and cured by heating, failure occurred in the compound away from the joint.

Having now described my invention, what I claim is:

1. A method of jointing tire treads comprising applying a coating of an adhesive composition comprising a synthetic polymer of a conjugated diene of 4–5 carbon atoms having at least a substantial portion of the diene units in the polymer in a trans-1,4-configuration to spliced ends of the tread and bringing the coated ends into contact to form a joint.

2. A method according to claim 1 in which the adhesive composition comprises at least one further elastomer selected from the group consisting of natural rubber, cis-polybutadiene, cis-polyisoprene, emulsion-produced polybutadiene, copolymers of butadiene and styrene, copolymers of ethylene and propylene, butyl rubber, polyisobutylene and amorphous polypropylene.

3. A method according to claim 1 in which the adhesive composition is applied to the ends of the tread in the unvulcanized state and is vulcanized after the coated ends of the tread are brought into contact.

4. A method according to claim 1 in which the adhesive composition comprises in addition a resinous ingredient selected from the group consisting of petroleum hydrocarbon resins, para-substituted phenol-formaldehyde resins, terpene resins, coumarone-indene resins and wood rosin derivatives.

5. A method according to claim 1 in which the adhesive composition is applied as a solution in a chlorinated solvent.

6. A method according to claim 1 in which the polymer is trans-polyisoprene.

7. A method according to claim 1 in which the polymer is trans-polybutadiene.

8. A method according to claim 1 in which the polymer is trans-polypiperylene.

References Cited

UNITED STATES PATENTS

| | | | |
|---|---|---|---|
| 1,385,220 | 7/1921 | Marquette | 156—122 |
| 2,182,169 | 12/1939 | Bierer | 156—304 X |
| 2,366,219 | 1/1945 | Soday | 260—890 X |
| 2,386,696 | 10/1945 | Lloyd. | |
| 2,742,942 | 4/1956 | Owen | 260—890 X |
| 2,955,640 | 10/1960 | Barns | 156—304 |
| 3,166,609 | 1/1965 | Wilder | 260—894 |
| 3,205,214 | 9/1965 | Talcott | 260—894 X |
| 3,213,160 | 10/1965 | Crouch | 260—5 X |
| 3,237,673 | 3/1966 | Ward | 156—304 |
| 3,244,773 | 4/1966 | Crouch | 260—894 |

OTHER REFERENCES

Plesch: The Chemistry of Cationic Polymerization, published by the MacMillan Co. of New York, (1963), p. 354 relied upon.

EARL M. BERGERT, *Primary Examiner.*

MURRAY TILLMAN, HAROLD ANSHER, *Examiners.*

G. F. LESMES, *Assistant Examiner.*